UNITED STATES PATENT OFFICE.

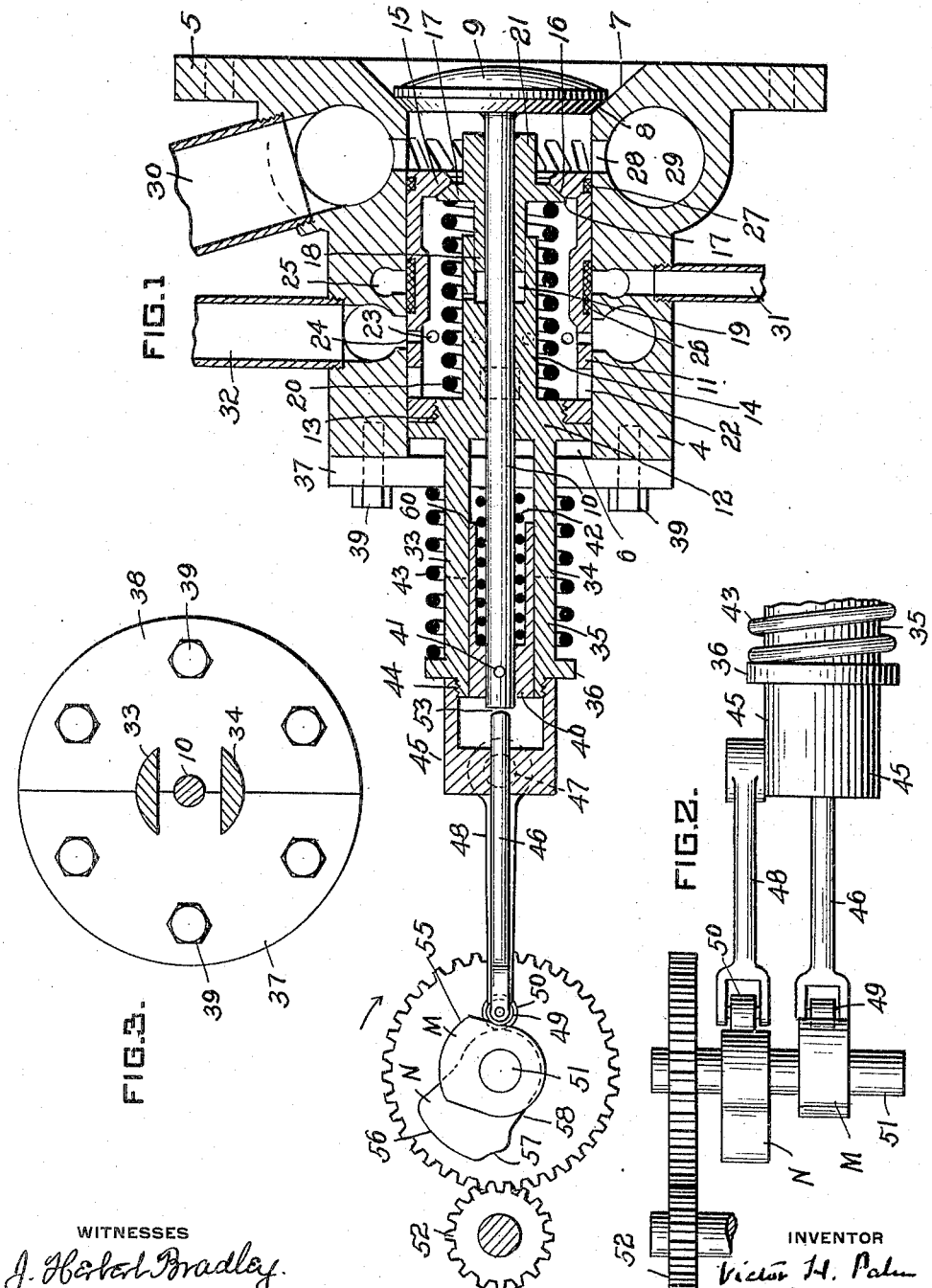

VICTOR H. PALM, OF BUTLER, PENNSYLVANIA.

COMBINED INLET AND EXHAUST VALVE.

1,325,904.

Specification of Letters Patent.

Patented Dec. 23, 1919.

Application filed December 30, 1918. Serial No. 268,856.

*To all whom it may concern:*

Be it known that I, VICTOR H. PALM, a citizen of the United States, and a resident of Butler, in the county of Butler and State of Pennsylvania, have made a new and useful Invention in Combined Inlet and Exhaust Valves, of which the following is a specification.

This invention relates to combined inlet and exhaust valves for internal combustion engines and as an object has the provision of a simple combined inlet and exhaust valve in which the exhaust ports leading from the valve housing are completely sealed during the inlet strokes of the engine and in which the air and gas ports leading to the valve housing are completely sealed during the exhaust strokes of the engine.

This, as well as other objects which will readily appear to those skilled in this particular art, I attain in the device described in the specification and illustrated in the drawings accompanying and forming a part of this application and throughout which similar elements are denoted by like characters.

In the drawings, Figure 1 is a longitudinal sectional view of a device embodying this invention, Fig. 2 is a top plan view of a portion of said device and Fig. 3 is a view partially in elevation and partially in section illustrating a portion of the device.

In the preferred embodiment, the device consists of a valve housing 4 provided with an annular flange 5 adapted to be secured to the cylinder head or other suitable portion of an internal combustion engine.

The valve housing is centrally bored to provide a valve chamber 6 and at its outer end is faced as at 7 to provide a seat 8 for a poppet valve 9, the stem 10 of which extends centrally through bore 8.

A two part piston valve is fitted to slide within bore 6 of the valve housing and to its cylindrical portion 11 a valve stem portion 12 is threaded as shown at 13. Portion 12 of the valve has a central boss 14 which extends into cylindrical part 11 of the valve and this boss is bored to form a guide for stem 10 of poppet valve 9. The outer end of the piston valve is provided with an inwardly extending annular flange 15 and at 16 this is faced to form a seat for a poppet valve 17 which is arranged to slide on stem 10 of valve 9. Valve 17 is provided with a stem portion 18 which telescopes within an enlarged bore 19 in boss 14. A coil spring 20 surrounding boss 14, bears against the underside of valve 17 and tends to yieldingly hold the same to its seat in the piston valve. Valve 17 has a projection 21 which at times is adapted to abut against the inner face of poppet valve 9 to hold said valve 9 and valve 17 from their respective seats.

The piston valve is provided with an annular row of air ports 22 and with an annular row of gas ports 23 which respectively register with air ports 24 and gas ports 25 formed in the valve housing; the registration takes place when the piston valve is at the forward end of its travel. A snap ring 26 placed in a groove formed in the piston valve seals the gas ports at such times as the piston valve is near the inner end of its travel, and a snap ring 27 placed near the outer end of the piston valve prevents leakage between the valve and its bore. The exhaust passes from the valve housing through an annular series of ports 28 which communicate with an annular exhaust chamber 29 formed in the housing and adapted to be connected to an exhaust pipe 30. Gas is led to gas ports 25 by means of a pipe 31 and air to air ports 24 by means of an air pipe 32.

Head member 12 of the piston valve is provided with two arms or stems 33 and 34 which extend through the rear end of the bore for the piston valve and connect with a cylindrical portion 35 provided with an annular shoulder 36. A head for closing the outer end of the valve housing is formed of two semi-circular plates 37 and 38 which are correspondingly slotted so as to fit around piston valve stems 33 and 34 and valve stem 10 of the poppet valve 9. These two plates abut one against the other and are secured to the valve housing by means of machine screws 39.

The cylindrical part 35 of the piston valve stem forms a guide for a cylindrical thimble 40 which is pinned at 41 to the stem of poppet valve 9 and a coil spring 42 which surrounds the stem of the poppet valve and lies within the thimble by bearing against the head of the valve housing tends to yieldingly hold the poppet valve to its seat.

A coil spring 43 which surrounds the stem of the piston valve and at one end bears against shoulder 36 and at the other against the head of the valve housing yieldingly holds the piston valve at the limit of its outer travel away from poppet valve 9.

The outer end of the piston valve stem is threaded at 44 to receive a cap 45 which at its center is drilled to form a guide for a tappet 46. Cap 45 is provided with a pin 47 to which a tappet 48 is secured. Tappets 46 and 48 at their outer ends carry rollers 49 and 50, respectively. A cam shaft 51 driven at half the engine speed by means of suitable gearing 52 carries two cams, an exhaust cam M in line with roller 49 and an inlet cam N in line with roller 50. A slight clearance is left at 53 between the outer end of poppet valve stem 10 and the inner end of tappet 46. Coil spring 43 holds roller 50 in contact with cam N at all times and since the valve has no seat its operation is noiseless.

At the beginning of the exhaust stroke poppet valve 9 by means of cam surface 55 of cam M is opened and by said cam is held open during the complete exhaust stroke. During the inlet stroke cam face 56 of valve N moves and holds the piston valve at the limit of its inner stroke and therefore holds poppet valve 9 open during this stroke as projection 21 of valve 17 abuts against the inner face of poppet valve 9. Valve 17 is also held open or away from its seat 16 in the piston valve, against the stress of spring 20 since the inner end 60 of thimble 40 by contacting with the end plate of the valve housing stops the farther inner movement of valve 9.

The piston valve while at the end of its forward movement completely seals the exhaust passages. When the piston valve has reached the forward end of its stroke its air and gas ports are in register with the air and gas ports of the valve housing.

Cam N is provided with a depression 57 which allows the piston valve to move outwardly away from the engine cylinder before the inlet stroke has been fully completed; the gas ports therefore are closed slightly in advance of the complete closure of the air ports and in this way a combustible mixture is withdrawn from the interior of the piston valve, and the valve housing at the end of each inlet stroke is scavenged by a blast of air. The clearance between the projection 21 of poppet valve 17 and the inner face of poppet valve 9 is such that the piston valve closes exhaust ports 28 before valve 17 opens during the further movement of the piston valve projection 21 of valve 17 by reason of spring 20 forces valve 9 to the limit of its inner movement and holds it there until the end of the inlet stroke, when the piston valve moves away from the cylinder. When the piston valve is closing poppet valves 9 and 17 are allowed to come to their seats without pounding.

The piston valve, having no seat, is allowed to ride on cam N during its full revolution. Portion 58 of cam N is preferably formed with a gradual decline which is effective while the piston valve is completing its outer stroke or the stroke away from the cylinder, and this is possible since poppet valve 9 forms the seal for the valve device during the compression and expansion strokes.

Valve 17 seals the interior of the piston valve from the exhaust gases during the exhaust stroke thereby keeping the interior of the piston valve clean and free from exhaust gases.

Spring 42 which holds poppet valve 9 to its seat need not have as much tension as is now necessary in exhaust valve springs, since valve 9 is open when the combustible charge is drawn in through the piston valve. The tension of spring 43 is such as to keep roller 50 in contact with cam N and the tension of spring 20 should be such as to overcome any back pressure in exhaust pipe 30.

In accordance with the provisions of the patent statutes I have described the principle of operation of my invention, together with the device which I now consider to represent the best embodiment thereof, but I desire to have it understood that the device shown is only illustrative and that the invention can be carried out in other ways.

Having thus described my invention, what I claim as new and desire to secure by Letters Patent is—

1. In a combined inlet and exhaust valve for internal combustion engines, a valve housing provided with an exhaust port and a fuel port, a piston valve having an inlet port and an outlet port and slidable within said housing for controlling the housing ports, a poppet valve axially alined with said piston valve and having a stem passing therethrough, a valve slidable on said stem and controlling the outlet to said piston valve, and means for independently operating said poppet and piston valves.

2. In a combined inlet and exhaust valve device for internal combustion engines, a valve housing provided with a valve bore having inlet and exhaust ports, a piston valve slidable in said bore and having inlet ports and an outlet port, a poppet valve axially alined with said piston valve and having a stem projecting therethrough, a valve slidable on the stem of said poppet valve for controlling the outlet to said piston valve, a spring within the piston valve for seating said latter poppet valve, means for operating said piston and poppet valves, and means for holding said latter valve from its seat during the inlet stroke of the engine.

3. In a combined inlet and exhaust valve for internal combustion engines, a poppet valve for controlling the engine inlet and exhaust, a ported piston valve coöperating with said poppet valve in such control, a valve operated by the relative movements between said poppet and piston valves for controlling the outlet of said piston valve, and synchronously operating cam devices for actuating said poppet and piston valves.

4. In a combined inlet and exhaust valve for internal combustion engines, a poppet valve for controlling the inlet and exhaust to the engine, a piston valve axially alined with the poppet valve and coöperating therewith in such control, said piston valve having ports for the entry of fuel thereinto and a port for the outlet of fuel therefrom, a valve controlling said outlet and having its operation dependent upon the relative movement between said poppet and piston valves, means for seating said latter valve and cam devices for operating said piston and poppet valves.

5. In a combined inlet and exhaust valve for internal combustion engines, axially alined poppet and piston valves, means for independently operating the same, and means the operation of which is due to the relative movement between said valves for opening and closing said piston valve.

6. In a combined inlet and exhaust valve for internal combustion engines, a poppet valve, a stop for limiting the movement of said valve away from its seat, an open ended piston valve axially alined with the poppet valve and formed with a guide therefor, an inwardly opening valve for closing the open end of the piston valve, a spring within the piston valve for seating said inwardly opening valve, means for operating said poppet valve, and means whereby said spring is caused to hold said poppet valve open during the inlet strokes of the engine.

7. In a combined inlet and exhaust valve for internal combustion engines, a valve housing a cylindrical sleeve valve slidable within said housing, a valve controlling the outlet of said sleeve valve, a poppet valve axially alined with said valves and having its stem projecting therethrough, a stop for limiting the movement of said poppet valve away from its seat, a cam for operating said poppet valve during the engine exhaust strokes, a cam for operating said sleeve valve and a spring within said sleeve valve for holding said poppet valve open during the engine inlet strokes.

8. In a combined inlet and exhaust valve for internal combustion engines, a valve housing provided with air and gas ports and an exhaust port, a sleeve valve controlling said ports and provided with a seat, a poppet valve axially alined with said sleeve valve and serving as a combined inlet and exhaust valve, a third valve slidable on the poppet valve stem for controlling the flow from said sleeve valve, a spring within the sleeve valve for forcing said third valve to its seat, and means for operating said sleeve and poppet valves.

9. In a combined inlet and exhaust valve for internal combustion engines, a valve housing having a cylindrical bore and provided with air and gas ports, a sleeve valve fitting said bore, a poppet valve provided with a stem extending through said sleeve valve, means for operating said valves and a packing ring carried by said sleeve valve arranged so as to seal said gas ports during the compression strokes of the engine.

10. In a combined inlet and exhaust valve device for internal combustion engines, a ported valve housing, a sleeve valve controlling said ports and having a valved outlet, a spring within the sleeve valve for closing said valved outlet, a poppet valve axially alined with said sleeve valve, and means for operating said sleeve and poppet valves independently.

11. In a combined inlet and exhaust valve device, axially alined cam operated poppet and sleeve valves, a third valve seating in said sleeve valve and slidable on the poppet valve stem, and a spring within the sleeve valve for seating said third valve.

In witness whereof, I have hereunto subscribed my name this 23rd day of December, 1918.

VICTOR H. PALM.

Witnesses:
 HARRY L. GRAHAM,
 M. R. SHANER.